United States Patent
Senzaki

(10) Patent No.: US 12,038,502 B2
(45) Date of Patent: Jul. 16, 2024

(54) SHIP BEHAVIOR ANALYZING DEVICE, SHIP BEHAVIOR ANALYZING METHOD, AND NON-TRANSITORY COMPUTER-READABLE MEDIUM

(71) Applicant: NEC Corporation, Tokyo (JP)

(72) Inventor: Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 399 days.

(21) Appl. No.: 17/427,991

(22) PCT Filed: Feb. 6, 2019

(86) PCT No.: PCT/JP2019/004306
§ 371 (c)(1),
(2) Date: Aug. 3, 2021

(87) PCT Pub. No.: WO2020/161843
PCT Pub. Date: Aug. 13, 2020

(65) Prior Publication Data
US 2022/0120892 A1     Apr. 21, 2022

(51) Int. Cl.
*G01S 13/90*     (2006.01)
*G08G 3/00*     (2006.01)

(52) U.S. Cl.
CPC ...... *G01S 13/9029* (2013.01); *G01S 13/9027* (2019.05); *G08G 3/00* (2013.01)

(58) Field of Classification Search
CPC .......... G01S 13/88; G01S 13/89; G01S 13/90; G01S 13/9021; G01S 13/9027; G01S 13/9029; G08G 3/00
(Continued)

(56) References Cited

U.S. PATENT DOCUMENTS 8,422,738 B1 *   4/2013   Stastny ................. G06V 10/30
                                                                382/103
2016/0247011 A1 *   8/2016   Abileah ................. G06V 20/13

FOREIGN PATENT DOCUMENTS

JP     2000-067400 A     3/2000
JP     2001-004398 A     1/2001
(Continued)

OTHER PUBLICATIONS

Reggiannini, Marco, and Luigi Bedini. "Multi-Sensor Satellite Data Processing for Marine Traffic Understanding." Electronics (Basel) 8.2 (2019): 152-. Web. (Received: Dec. 12, 2018; Accepted: Jan. 26, 2019; Published: Feb. 1, 2019) Relevant: Abstract, Sections 1, 2, 4.3, 4.5 (Year: 2019).*

(Continued)

*Primary Examiner* — Vladimir Magloire
*Assistant Examiner* — Remash R Guyah

(57) ABSTRACT

An object of an example embodiment of the present disclosure is to stably estimate a navigation status of a target ship at a predetermined time from time-series position information of the ship. A ship behavior analyzing device according to the example embodiment of the present disclosure includes a ship detection means for detecting a ship from synthetic aperture radar (SAR) data, a wake extraction means for extracting a wake of the detected ship, a wake pattern generation means for generating a wake pattern image by using the extracted wake, and a navigation status estimation means for estimating a navigation status of the target ship by using the generated wake pattern image.

7 Claims, 10 Drawing Sheets

(58) Field of Classification Search
USPC .................................................... 342/25 B
See application file for complete search history.

(56) References Cited

FOREIGN PATENT DOCUMENTS

| JP | 2001004398 | A | * | 1/2001 |
| JP | 2005-096674 | A | | 4/2005 |
| JP | 2008-009846 | A | | 1/2008 |
| JP | 2008009846 | A | * | 1/2008 |
| JP | 2015-148452 | A | | 8/2015 |

OTHER PUBLICATIONS

International Search Report for PCT Application No. PCT/JP2019/004306, mailed on Apr. 23, 2019.
Xiang Jiang et al., "Fishing Activity Detection from AIS Data Using Autoencoders", 29th Canadian Conference on Artificial Intelligence, Canadian AI 2016, Victoria, BC, Canada, May 31-Jun. 3, 2016, pp. 33-39.

* cited by examiner (a) POSITION INFORMATION (b) POSITION INFORMATION
(MAPPING ON GRID)

(c) WAKE

SHIP BEHAVIOR ANALYZING DEVICE, SHIP BEHAVIOR ANALYZING METHOD, AND NON-TRANSITORY COMPUTER-READABLE MEDIUM

This application is a National Stage Entry of PCT/JP2019/004306 filed on Feb. 6, 2019, the contents of all of which are incorporated herein by reference, in their entirety.

TECHNICAL FIELD

The present disclosure relates to a ship behavior analyzing device, a ship behavior analyzing method, and a non-transitory computer-readable medium.

BACKGROUND ART

In recent years, environmental destruction and resource depletion due to illegal fishing have become a global problem. In order to curb illegal fishing, an automatic identification system (hereinafter, referred to as AIS), which communicates information, such as the identification code, type, position, course, velocity, and navigation status of a ship, between ships and with a ground base station, is attracting attention. Since the navigation status data of the AIS includes a code indicating that fishing is being conducted, it is expected to grasp the fishing activity of each ship and further to grasp the actual condition of fishing in an entire sea area by correctly operating the AIS.

However, in general, there are two types of AIS mounted on a ship: class A and class B, and in many cases, the AIS mounted on a fishing boat is an inexpensive class B having no function of transmitting a navigation status. Furthermore, even though a fishing boat provided with the class A increases, there is a problem that malicious camouflage can be easily performed because the navigation status of the AIS is manually input by seafarers.

In order to solve the above problem, Non Patent Literature 1 discloses a method for discriminating between fishing and ship behavior other than fishing from a wake pattern generated from time-series position information of a ship. In the method, a wake image is generated by connecting discrete AIS data points with a line and a large number of generated wake images are learned with a neural network. Since a ship that is fishing shows a characteristic wake, this method can perform binary discrimination between fishing and non-fishing with high accuracy.

Furthermore, Patent Literature 1 discloses a suspicious ship detection method for monitoring a ship existing around own ship by a radar to analyze a behavior pattern of the ship cruising around the own ship, comparing the behavior pattern with a suspicious behavior pattern of a suspicious ship registered in a database beforehand, and acknowledging, as a suspicious ship, a ship having a behavior pattern consistent with or similar to the suspicious behavior pattern.

CITATION LIST

Non Patent Literature

Xiang Jiang, Daniel L. Silver, Baifan Hu, Erico N. de Souza, Stan Matwin: "Fishing Activity Detection from AIS Data Using Autoencoders," Canadian Conference on AI 2016: 33-39.

Patent Literature

Japanese Unexamined Patent Application Publication No. 2005-96674

SUMMARY OF INVENTION

Technical Problem

The ship behavior analyzing method disclosed in Non Patent Literature 1 discriminates the fishing and non-fishing navigation status of each ship on the basis of received AIS signals. However, since the AIS can stop the transmission of signals by the judgment of seafarers, it is not realistic to obtain the AIS from a ship that is fishing illegally. Therefore, in the ship behavior analyzing method disclosed in Non Patent Literature 1, it is necessary to establish a ship behavior analyzing method in the actual operation environment even in an environment where a malicious user has stopped the AIS.

Furthermore, the method according to Patent Literature 1 discloses a technology of detecting a suspicious ship around a ship by using a radar mounted on the ship. However, in such a case, since the range (about several tens of km) of the radar mounted on the ship is relatively narrow, there is a problem that it is not possible to monitor an entire sea area. Furthermore, since the purpose is basically to detect ships (pirates and the like) that are malicious to the own ship, there is a problem that it does not cope with suspicious behavior that does not target the own ship.

One object of the present invention is to provide a ship behavior analyzing device, a ship behavior analyzing method, and a non-transitory computer-readable medium, by which a navigation status of a target ship is stably estimated at a predetermined time from time-series position information of the ship.

Solution to Problem

A ship behavior analyzing device according to a first aspect of the present disclosure includes a ship detection means for detecting a ship from synthetic aperture radar (SAR) data, a wake extraction means for extracting a wake of the detected ship, a wake pattern generation means for generating a wake pattern image by using the extracted wake, and a navigation status estimation means for estimating a navigation status of the ship by using the generated wake pattern image.

A ship behavior analyzing method according to a second aspect of the present disclosure includes detecting a ship from synthetic aperture radar data, extracting a wake of the detected ship, generating a wake pattern image by using the extracted wake, and estimating a navigation status of the ship by using the generated wake pattern image.

A non-transitory computer-readable medium storing a program according to a third aspect of the present disclosure causes a computer to perform detecting a ship from synthetic aperture radar data, extracting a wake of the detected ship, generating a wake pattern image by using the extracted wake, and estimating a navigation status of the ship by using the generated wake pattern image.

Advantageous Effects of Invention

According to the present disclosure, it is possible to stably estimate a navigation status of a target ship at a predetermined time from time-series position information of the ship.

DESCRIPTION OF EMBODIMENTS

Example 1

Hereinafter, example embodiments of the present disclosure will be described with reference to the drawings. A first example embodiment of the present disclosure will be described. In the first example embodiment, first, parameters of a navigation status estimator for estimating a navigation status of a wake pattern are learned using wake pattern images generated from AIS data. Then, at the time of actual operation, a navigation status of a ship is estimated using learned parameters with respect to the wake pattern images generated on the basis of a wake of the ship extracted from image data of a synthetic aperture radar and the like.

First, a ship behavior learning device for improving the accuracy of estimating a navigation status of a ship will be described.

Figure 1:
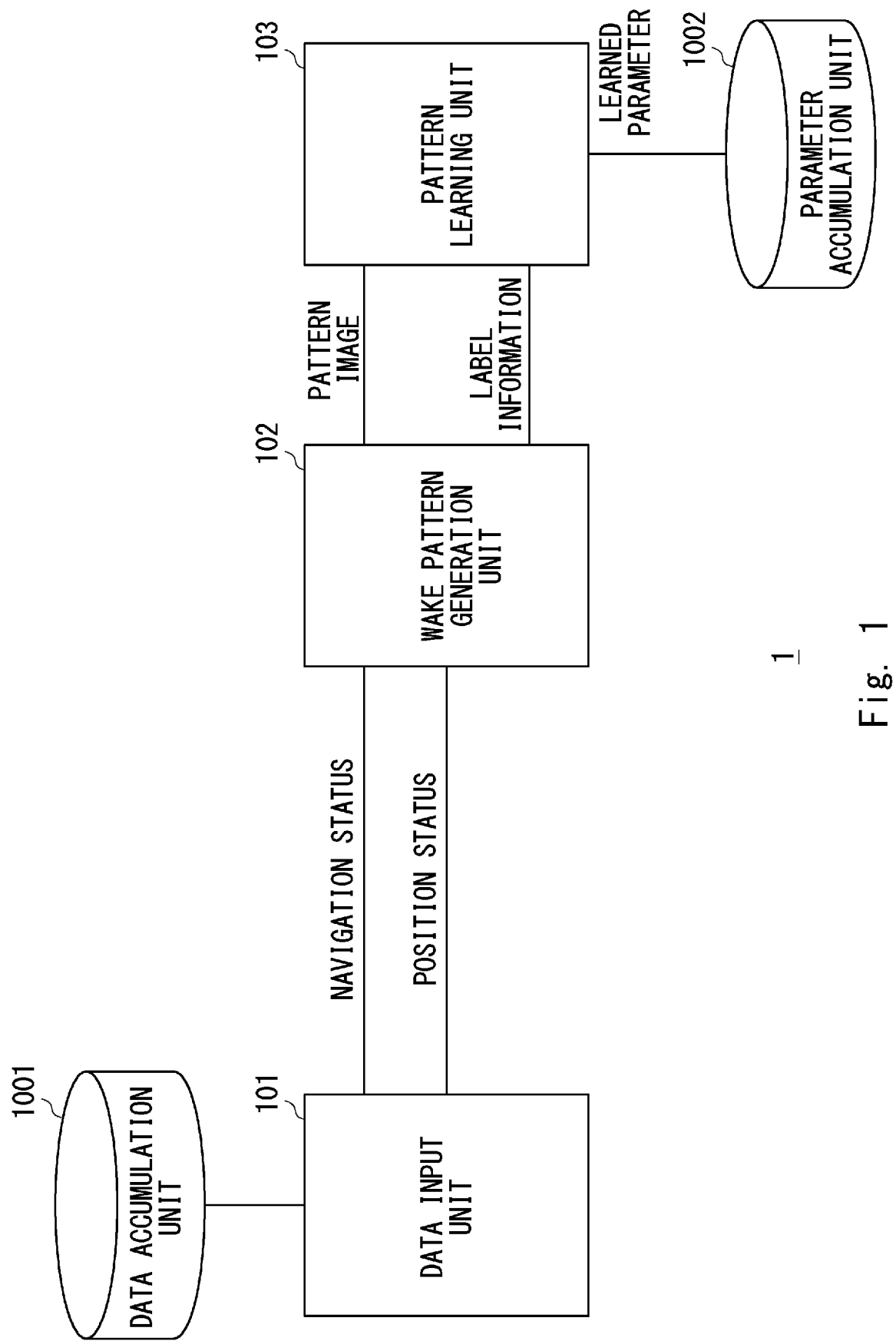
FIG. 1 is a block diagram illustrating a configuration of a ship behavior learning device according to a first example embodiment of the present invention.

Referring to FIG. 1, the first example embodiment of the present invention serves as a ship behavior learning device 1, and includes a data input unit 101, a wake pattern generation unit 102, a pattern learning unit 103, a data accumulation unit 1001, and a parameter accumulation unit 1002. That is, a control unit of the ship behavior learning device 1 serves as a functional calculation unit that performs each of these subdivided processes. The control unit has a central processing unit (CPU), a main storage device, an auxiliary storage device, an external interface, and the like. The auxiliary storage device is an example of a non-transitory computer-readable medium to be described below.

The data input unit 101 extracts data on a temporally continuous navigation status and position information of each ship from the data accumulation unit 1001 that accumulates navigation information of a ship, and outputs the data on the navigation status and the data on the position information to the wake pattern generation unit 102. In general, data acquired from GPS or AIS includes speed information, but when there is no speed information, it is possible to calculate a speed from a spatial distance and a temporal distance between two consecutive points. The temporal distance can be obtained from the acquisition date and time of data between the two consecutive points.

The "navigation status of the ship" refers to, for example, the status of the ship such as steaming (navigation using an engine), anchoring (anchored and moored), mooring (anchored at a quay wall, and the like), and during fishing.

The wake pattern generation unit 102 determines a speed information-based drawing method from the data on the position information and the speed information input from the data input unit 101, and generates wake pattern images drawn by interpolating between discrete position information. Then, the wake pattern generation unit 102 sets a navigation status corresponding to the wake pattern images as a correct label of a main wake pattern with respect to the data on the navigation status input from the data input unit 101. Then, the wake pattern generation unit 102 outputs the generated wake pattern images and label information to the pattern learning unit 103.

The pattern learning unit 103 machine-learns the wake pattern images by supervised learning from the wake pattern images and the label information input from the wake pattern generation unit 102, and optimizes parameters of a navigation status classifier. Then, the pattern learning unit 103 stores the optimized parameters (learned parameters) in the parameter accumulation unit 1002.

The data accumulation unit 1001 is a database in which the navigation information of the ship is stored. The data accumulation unit 1001 accumulates or transmits the navigation information of the ship. The data accumulation unit 1001 is implemented by a storage medium such as a hard disk and a memory card that store the navigation information of the ship, a network to which they are connected, and the like.

The parameter accumulation unit 1002 accumulates or transmits parameters of a ship behavior classifier. The parameter accumulation unit 1002 is implemented by a storage medium such as a hard disk and a memory card that store the parameters (learned parameters) of the ship behavior classifier, which are generated by the pattern learning unit 103, a network to which they are connected, and the like.

Hereinafter, details of the operation of each characteristic part of the present invention will be described.

With reference to FIG. 2, the following description will be provided for the process in which the wake pattern generation unit 102 generates the wake pattern images from the data on the position information, and the process in which the wake pattern generation unit 102 sets the label corresponding to the wake pattern.

First, the wake pattern generation unit 102 selects one piece of data at an arbitrary time as a reference from a dataset of continuous time-series position information $p_i$ and navigation status $s_i$. Here, it is assumed that the reference time is T. Furthermore, $p_i$ is absolute position information such as latitude and longitude. When it is assumed that the latitude is $lng_i$ and the longitude is $lat_i$, $p_i$ is expressed by formula 1 below.

[Math 1]

$$p_i = \begin{pmatrix} lng_i \\ lat_i \end{pmatrix} \quad \text{(Formula 1)}$$

Figure 2A:
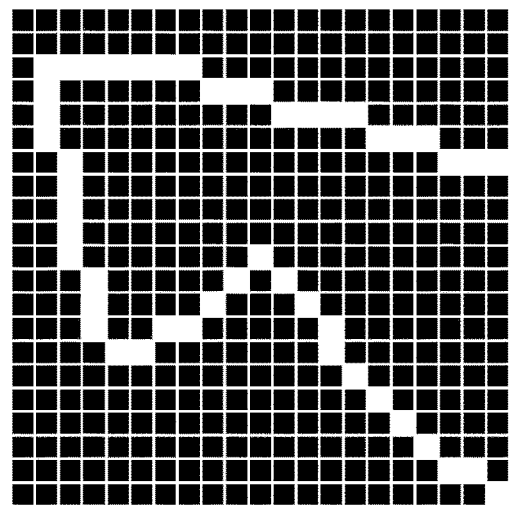
FIG. 2A is a diagram illustrating a procedure for generating a wake from position information.

When respective points are drawn, they become discrete points as illustrated in FIG. 2A, for example.

Next, the wake pattern generation unit 102 calculates position information $p_i'$ relative to the reference time T with respect to m pieces of data before and after the reference time $T_0$ by the following formula.

[Math 2]

$$p_i' = \text{round}(\alpha \times p_i) \quad \text{(Formula 2)}$$

The round(·) represents a rounding process to an integral value and $\alpha$ is a predetermined scalar value.

Figure 2B:
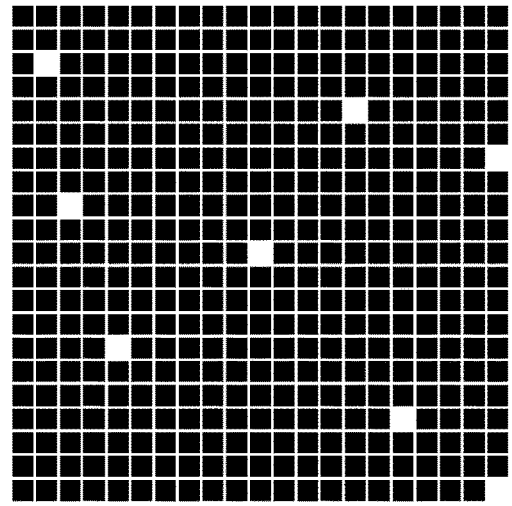
FIG. 2B is a diagram illustrating a procedure for generating a wake from position information.

Then, the wake pattern generation unit 102 maps each point $p_i'$ as illustrated in FIG. 2B while allowing the point at the reference time T to be located at the center of a grid with a predetermined size. At this time, when it is assumed that the resolution of one square of the grid is r, the aforementioned $\alpha$ is represented by $1/r$.

Figure 2C:
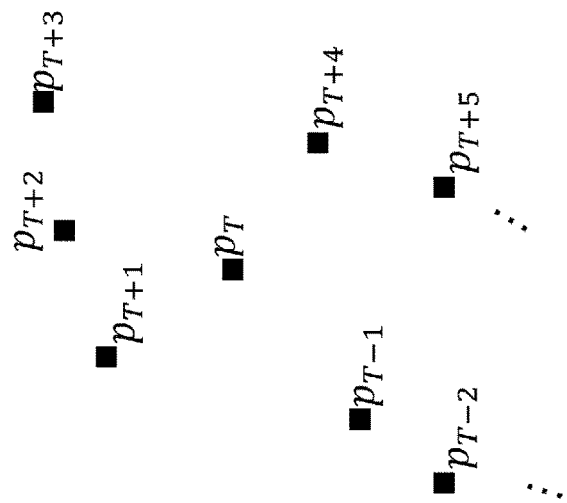
FIG. 2C is a diagram illustrating a procedure for generating a wake from position information.

Next, the wake pattern generation unit 102 connects the temporally consecutive points with a straight line to generate a wake image as illustrated in FIG. 2C.

Although a straight line is used herein for the sake of simplicity, it is not limited to a straight line in practice and spline interpolation and the like may also be used. When the time interval of data on the position information-speed information is not uniform, a process of allowing the time interval of data for each ship to be constant may be applied.

Then, the wake pattern generation unit 102 sets a navigation status $s_T$ at the time T as a correct label with respect to the navigation status indicated by the wake pattern images generated around the time T in this way.

By repeating the above process for an arbitrary ship at an arbitrary time, it is possible to generate a large number of image data sets with correct labels.

The following description will be provided for the process in which the pattern learning unit 103 machine-learns the wake pattern images by the supervised learning from the wake pattern images and the label information input from the wake pattern generation unit 102, and optimizes the parameters of the navigation status classifier.

Since there are a large number of image data with correct labels, a general supervised classifier may be used. There are a wide variety of such classifiers, but for example, a convolutional neural network (hereinafter, referred to as CNN) and the like may be used.

Moreover, in the present example embodiment, as will be described below, it is possible to configure a ship behavior analyzing device by using the parameters (learned parameters) obtained by the pattern learning unit.

Figure 3:
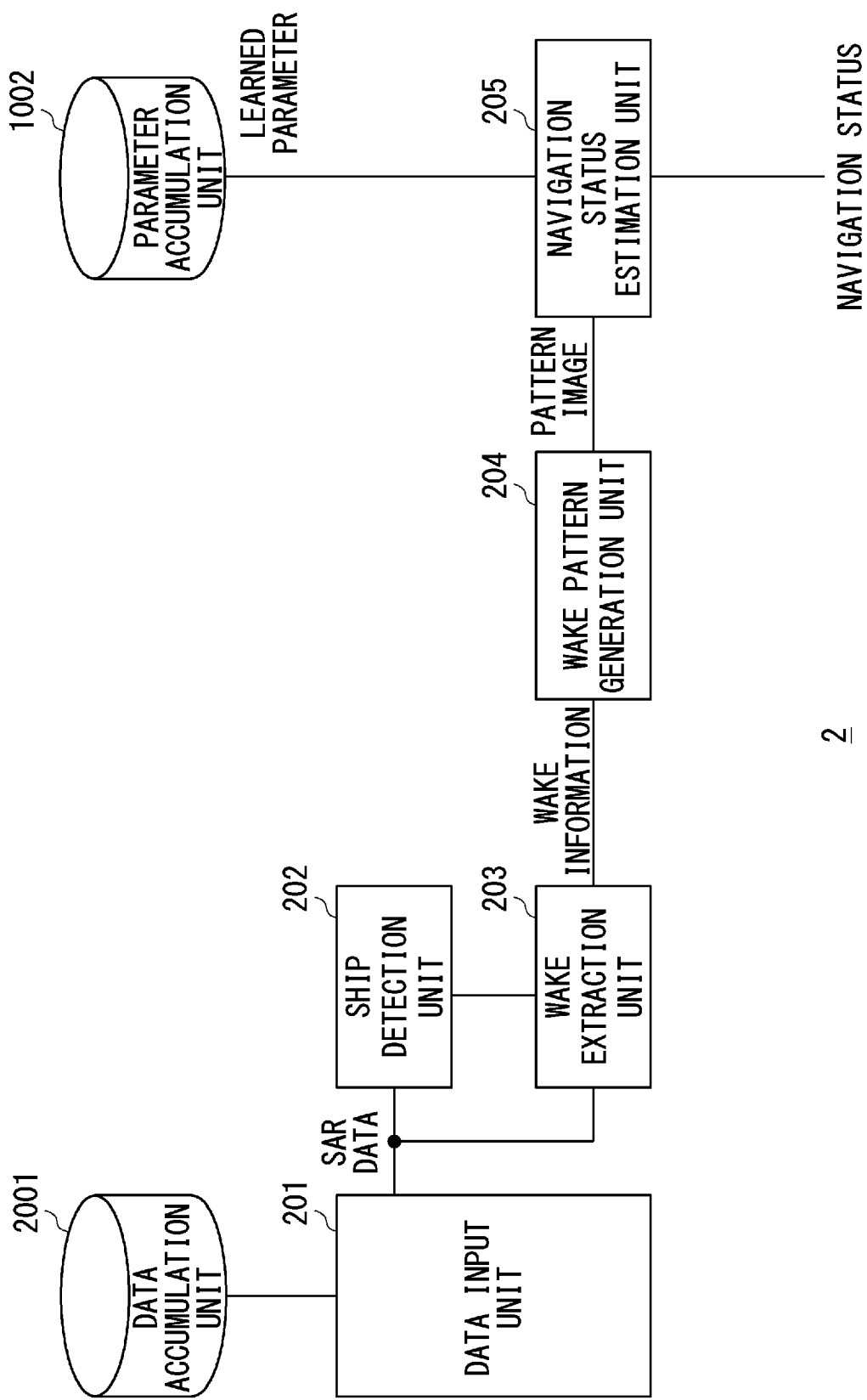
FIG. 3 is a block diagram illustrating a ship behavior analyzing device configured using parameters obtained by the ship behavior learning device according to the first example embodiment of the present invention.

A ship behavior analyzing device 2 illustrated in FIG. 3 includes a data input unit 201, a ship detection unit 202, a wake extraction unit 203, a wake pattern generation unit 204, a navigation status estimation unit 205, a data accumulation unit 2001, and a parameter accumulation unit 1002. That is, a control unit of the ship behavior analyzing device 2 serves as a functional calculation unit that performs each of these subdivided processes. The control unit has a central processing unit (CPU), a main storage device, an auxiliary storage device, an external interface, and the like. The auxiliary storage device is an example of a non-transitory computer-readable medium to be described below.

The data input unit 201 outputs SAR data to be analyzed to the ship detection unit 202 and the wake extraction unit 203 from the data accumulation unit 2001 that accumulates synthetic aperture radar data obtained by capturing the ocean. The SAR data is composed of a SAR image and its metadata (including observation time, observation conditions, and the like).

The ship detection unit 202 applies a ship detection process to the SAR data input from the data input unit 201, and detects ships. Then, the ship detection unit 202 outputs information (positions, sizes, and the like of the ships) of the detected ships to the wake extraction unit 203.

The wake extraction unit 203 extracts a wake from the SAR data input from the data input unit 201, on the basis of the ship information input from the ship detection unit 202. Then, the wake extraction unit 203 outputs information (position) on the extracted wake to the wake pattern generation unit 204.

The wake pattern generation unit 204 generates wake pattern images on the basis of the wake information input from the wake extraction unit 203. Then, the wake pattern generation unit 204 outputs the generated wake pattern images to the navigation status estimation unit 205.

The navigation status estimation unit 205 obtains learned classifier parameters with reference to the parameter accumulation unit 1002, reconstructs a classifier having the same configuration as the classifier learned by the pattern learning unit 103, and estimates a navigation status of each wake pattern image from the wake pattern images input from the wake pattern generation unit 204. Then, the navigation status estimation unit 205 outputs the estimated navigation status. As described above, according to the present example embodiment, it is possible to estimate a ship navigation status with high accuracy by using the learned classifier parameters.

Hereinafter, details of the operation of each characteristic part of the navigation status estimation device will be described.

The following description will be provided for the process in which the ship detection unit 202 detects ships from the SAR data. In the ship detection from the SAR data, a process using adaptive thresholding is widely used. The point of view of the adaptive thresholding is very simple, and corresponds to a method for detecting, as a ship, an extremely bright pixel compared to surrounding pixels. This is implemented by appropriately setting a threshold value of a pixel detected as a ship, on the basis of statistical analysis of the surrounding pixels. As the appropriate threshold setting method, the point of view of a constant false alarm rate (hereinafter, referred to as CFAR) is used. In the CFAR, surrounding pixels other than a detection target are regarded as background pixels and the distribution of pixel values of the background pixels is fitted to a predetermined probability density function. Then, a random variable, in which a cumulative distribution function of the obtained probability density function is a predetermined false alarm rate, is used as a threshold value. As the probability density function, a K-distribution, a generalized gamma distribution, and the like are used. When it is assumed that the probability density function is f and the predetermined false alarm rate is $P_{FA}$, if a threshold value $\tau$ satisfying the following formula is calculated, it becomes the threshold value $\tau$ that can expect the false alarm rate $P_{FA}$.

[Math 3]

$$P_{FA} = 1.0 - \int_{-\infty}^{\tau} f(x)dx \quad \text{(Formula 3)}$$

A pixel having a value equal or greater than the threshold value τ is detected as a ship-derived pixel. Moreover, subsequent to the present process, a process of uniquely assigning a label to each lump (cluster) of ship pixels is applied on the basis of the connectivity of the pixel detected as a ship. When the size of each cluster is not within a predetermined range, it may be possible to apply a process of excluding corresponding pixels from the ship detection result, and the like.

When land is included in the SAR image, the land may be erroneously detected as a ship because the land has a higher pixel value than that of the sea surface. Therefore, as a pretreatment, the land area may be excluded from the ship detection process by using map information and the like.

Figure 4:
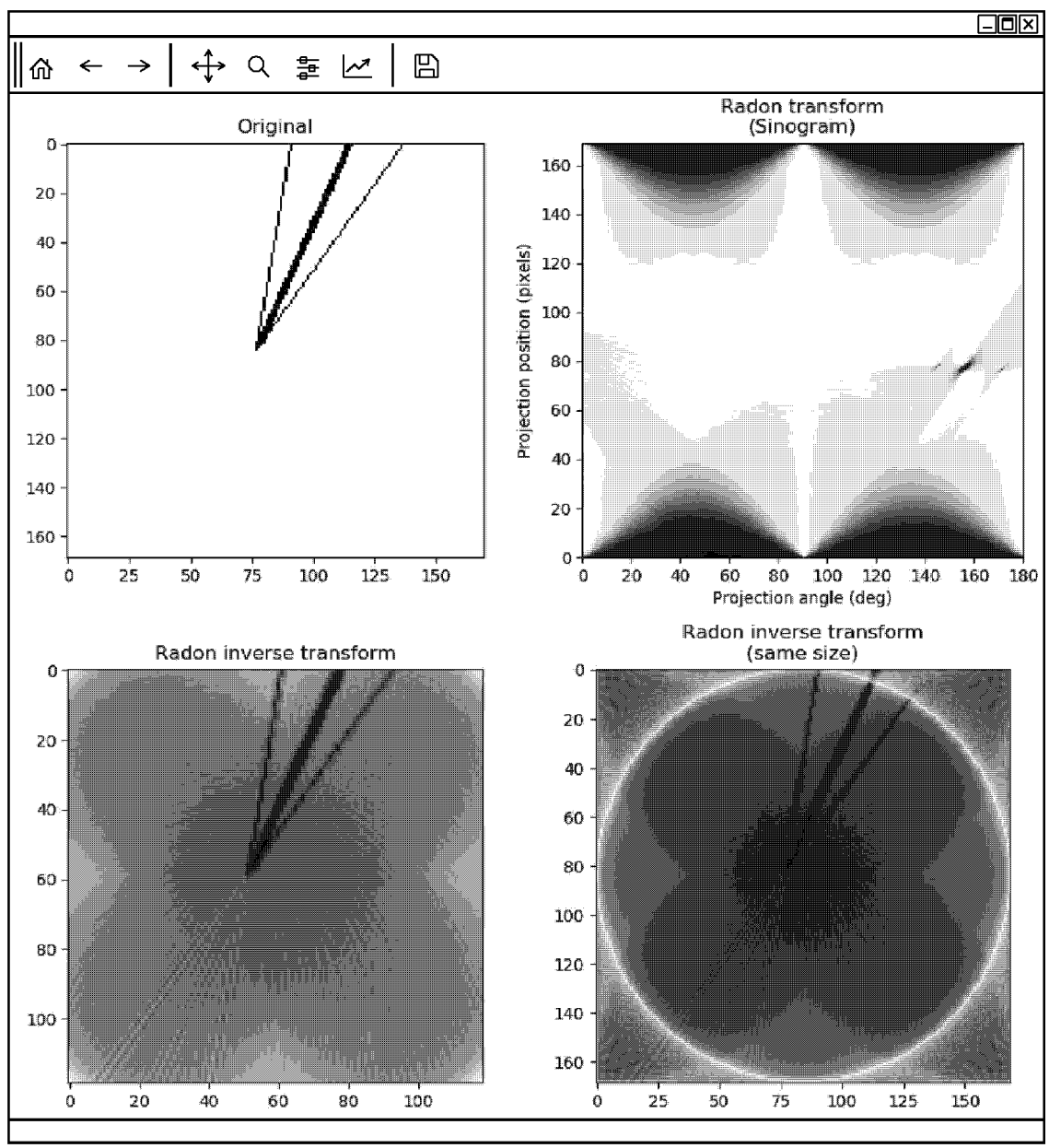
FIG. 4 is a diagram for explaining a wake image and Radon transform thereof.

With reference to FIG. 4, the following description will be provided for the process in which the wake extraction unit 203 extracts the wake from the SAR data on the basis of the ship information.

In general, it is known that there are five wakes created by a ship on the sear surface: one rear turbulence, Kelvin waves that are V-shaped waves, and V-shaped waves existing between the rear turbulence and the Kelvin waves. Among them, the rear turbulence tends to be a pixel darker than the sea surface, and the other four tend to be brighter than the sea surface. Furthermore, it is known that an angle formed by the Kelvin wave and the rear turbulence is about 19° and an angle formed by the V-shaped wave inside the Kelvin wave and the rear turbulence is about 4° from physical characteristics. The Kelvin wave and the V-shaped wave inside the Kelvin wave are utilized to robustly extract a wake, but the rear turbulence indicating a route taken by a target ship is an extraction target herein.

The ship detection result is used to generate a window with a predetermined size centered on the center coordinates of a certain one ship cluster. When there is a wake, the wake corresponds to a plurality of half lines passing near the center of the window. In order to detect the half lines, Radon transform is applied to pixels of the window. The Radon transform is a method for performing line integral on an input image in various directions, and when there is a straight line with a brightness different from the surroundings, a coefficient value in a Radon space corresponding to the angle and position of the straight line has a peak. Since the rear turbulence is darker than a sea surface pixel, a negative peak may be searched in the Radon space. In addition to the search for negative peaks, a set of coefficient values, in which the difference between a negative peak and a positive peak is maximum, may be searched based on the fact that the kelvin wave and the wave inside the kelvin wave are bright pixels. When performing the search of the set, a search range in the Radon space may be limited in consideration of physical characteristics. For example, since the kelvin wave has an angle difference of about 19° with respect to the rear turbulence, the search range of a positive peak corresponding to the kelvin wave may be limited to $\pm 19° \pm \delta_\theta$ with respect to candidates of a negative peak corresponding to the rear turbulence. Likewise, the search range of a positive peak corresponding to the wave inside the kelvin wave may be limited to $\pm 4° \pm \delta_\theta$.

After the rear turbulence is detected, it is possible to extract a wake by following the same half lines on the image.

The following description will be provided for the process in which the wake pattern generation unit 204 generates the wake pattern image on the basis of the wake information.

Since the wake pattern image input to the navigation status estimation unit 205 is a black and white binary image as illustrated in FIG. 2, the wake pattern generation unit 204 performs color coding so that the extracted wake is white and the other sea surface pixels are black. Then, the wake pattern generation unit 204 cuts out a wake image in a window with the same size as the wake pattern image used by the pattern learning unit 103 so that points on the wake are the center of the window at a predetermined sampling interval from the start point to the end point of the wake.

Hereinafter, effects of the present example embodiment will be described. In the present example embodiment, the navigation status of each ship detected from the SAR data is estimated on the basis of the wake pattern of the ship, so that it is possible to estimate the navigation status even for a ship in which an AIS signal is stopped.

Example 2

A second example embodiment of the present invention will be described. In the second example embodiment, first, the parameters of the navigation status estimator for estimating the navigation status of the wake pattern are learned using the wake pattern images generated from the AIS data. At this time, unlike the first example embodiment, the parameters are learned using speed information as well. Then, at the time of actual operation, the navigation status of the ship is estimated by performing navigation status estimation using the learned parameters with respect to wake pattern images generated on the basis of the wake of the ship extracted from the image data of the synthetic aperture radar and the like and a speed of the ship estimated from the wake on the image and the amount of position displacement of the ship.

Figure 5:
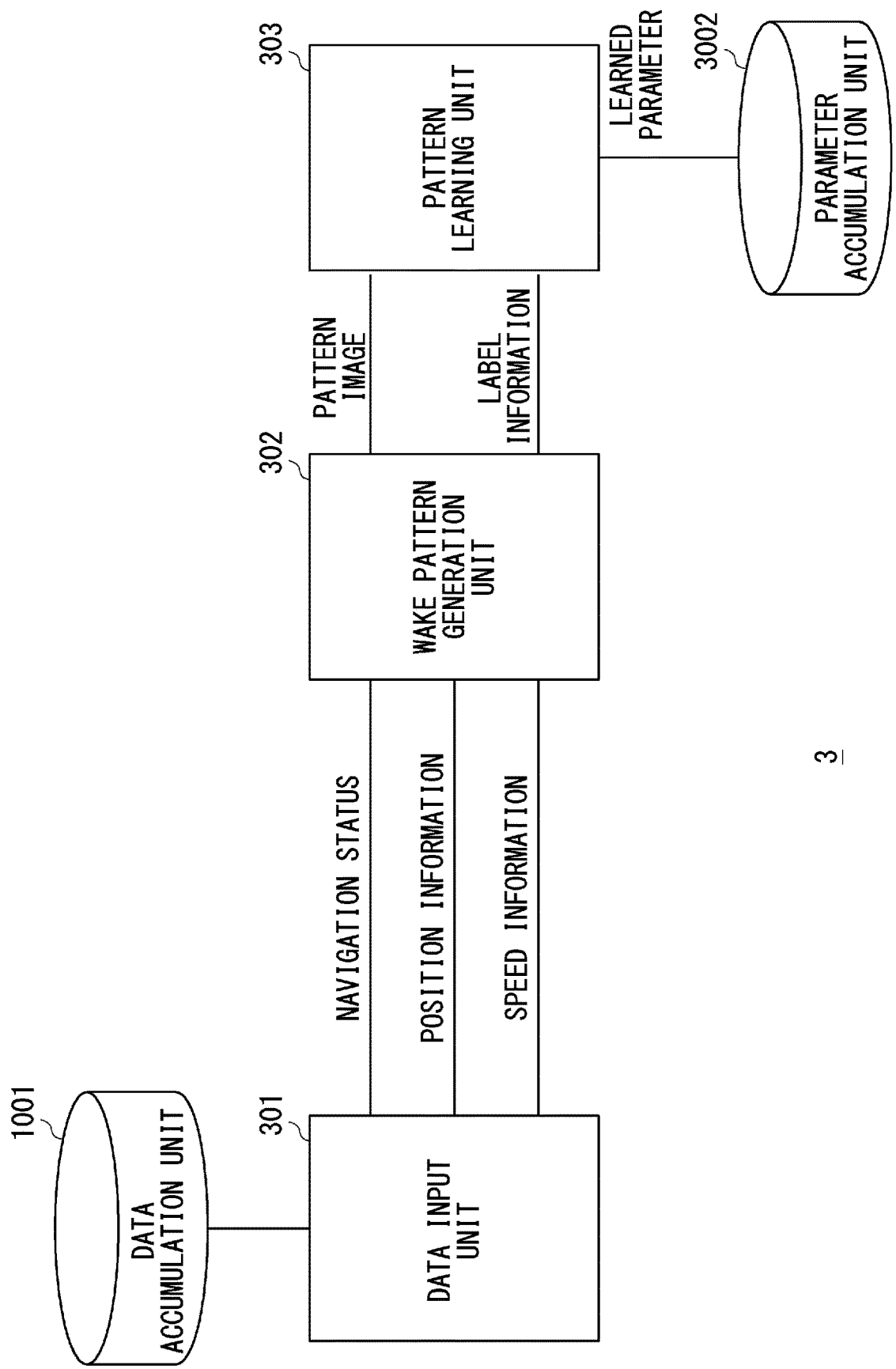
FIG. 5 is a block diagram illustrating a configuration of a ship behavior learning device according to a second example embodiment of the present invention.

Referring to FIG. 5, the second example embodiment of the present invention disclosure serves as a ship behavior learning device 3, and includes a data input unit 301, a wake pattern generation unit 302, a pattern learning unit 303, a data accumulation unit 1001, and a parameter accumulation unit 3002. That is, a control unit of the ship behavior learning device 3 serves as a functional calculation unit that performs each of these subdivided processes. The control unit has a central processing unit (CPU), a main storage device, an auxiliary storage device, an external interface, and the like. The auxiliary storage device is an example of a non-transitory computer-readable medium to be described below. Since the data accumulation unit 1001, which is a database that accumulates navigation information of a ship, is the same as that of the first example embodiment, a description thereof will be omitted.

The data input unit 301 extracts data on a temporally continuous navigation status, position information, and speed information of each ship, which are included in the database, from the data accumulation unit 1001, and outputs the data on the navigation status and the data on the position information and the speed information to the wake pattern generation unit 302. In general, data acquired from the GPS or the AIS includes speed information, but when there is no speed information, it is possible to calculate a speed from a spatial distance and a temporal distance between two consecutive points. The temporal distance can be obtained from the acquisition date and time of data between the two consecutive points.

The wake pattern generation unit 302 determines a speed information-based drawing method from the data on the position information and the speed information input from the data input unit 301, and generates wake pattern images drawn by interpolating between discrete position information. Then, the wake pattern generation unit 302 sets a navigation status corresponding to the wake pattern images as a correct label of a main wake pattern with respect to the data on the navigation status input from the data input unit 301. Then, the wake pattern generation unit 302 outputs the generated wake pattern images and label information to the pattern learning unit 303.

The pattern learning unit 303 learns the wake pattern images from the wake pattern images and the label information input from the wake pattern generation unit 302, and optimizes the parameters of the navigation status classifier. Then, the pattern learning unit 303 stores the optimized parameters in the parameter accumulation unit 3002.

The parameter accumulation unit 3002 accumulates or transmits the parameters of the ship behavior classifier. The parameter accumulation unit 3002 is implemented by a storage medium such as a hard disk and a memory card that store the parameters of the ship behavior classifier, which are generated by the pattern learning unit 303, a network to which they are connected, and the like.

Hereinafter, details of the operation of each characteristic part of the present invention will be described.

The following description will be provided for the process in which the wake pattern generation unit 302 generates the wake pattern images from the data on the position information and the speed information, and the process in which the wake pattern generation unit 302 sets the label corresponding to the wake pattern.

Since the procedure for generating the wake from the position information is the same as that of the wake pattern generation unit 102, a description thereof will be omitted. That is, a method for determining a wake drawing method on the basis of the speed information after the drawing of the wake of FIG. 2C is ended will be described.

First, the wake pattern generation unit 302 converts speed information $v_i$ existing in the AIS by using a predetermined maximum speed $v_{max}$ as expressed by the following formula, like the continuous time-series position information $p_i$ and the navigation status $s_i$, and calculates $v_i'$ normalized in the range of 0.0 to 1.0.

[Math 4]

$$v_i' = \begin{cases} v_i/v_{max} & v_i \le v_{max} \\ 1.0 & \text{otherwise} \end{cases} \quad \text{(Formula 4)}$$

For $v_{max}$, about 45 knots, which is the current maximum speed of a practical high-speed ship, may be input. Alternatively, it may be 22 knots (Japan), 24 knots (Europe), or 30 knots (USA) with reference to the definition of a high-speed ship in each country.

On the basis of the value of $v_i'$, the wake pattern generation unit 302 determines the wake drawing method of FIG. 2C. As an example, mapping of $v_i'$ to a hue circle will be described as a method for changing the color of a line drawn on the basis of $v_i'$. When the wake pattern generation unit 302 performs mapping so that the minimum value and the maximum value of v' are 0° and 360° of hue, respectively, since the minimum value and the maximum value of a speed are continuous on the hue circle, the wake pattern generation unit 302 performs mapping so that the minimum value corresponds to 0° (red) and the maximum value corresponds to 240° (blue). Hue $H_i$ is expressed by the following formula.

[Math 5]

$$H_i = \frac{240}{360} \times v_i' \quad \text{(Formula 5)}$$

From the above, the color in the HSV space that reflects the speed information of the ship is expressed by the following formula.

[Math 6]

$$C_i^{HSV} = [H_i, 1.0, 1.0] \quad \text{(Formula 6)}$$

The color of the RGB space generated finally is expressed by the following formula.

[Math 7]

$$C_i^{RGB} = f_{HSV2RGB}(C_i^{HSV}) \quad \text{(Formula 7)}$$

Note that $f_{HSV2RGB}(\cdot)$ represents a transform function from the HSV color space to the RGB color space.

In this way, the wake is colored on the basis of the speed information of the ship. The color at the point $p_i$ may use $C_i^{RGB}$, but the color of a line segment connecting the point $p_i$ and the point $p_{(i+1)}$ may be weighted and summed so that a color between the two points changes linearly, or an average value or one of the colors may be simply used.

The drawing method to be changed on the basis of $v_i'$ is not limited to color only, and may be, for example, the thickness, type, and the like of a line to be drawn. In the case of color, a 3-channel wake pattern image is generated, and in the case of line type and thickness, a 1-channel wake pattern image is generated.

Then, the wake pattern generation unit 302 sets the navigation status $s_T$ at the time T as a correct label with respect to the navigation status indicated by the wake pattern images generated around the time T in this way.

By repeating the above process for an arbitrary ship at an arbitrary time, it is possible to generate a large number of image data sets with correct labels.

The following description will be provided for the process in which the pattern learning unit 303 machine-learns the wake pattern images from the wake pattern images and the label information input from the wake pattern generation unit 302, and optimizes the parameters of the navigation status classifier.

Since there are a large number of image data with correct labels as in the pattern learning unit 103, the general supervised classifier may be used. There are a wide variety of such classifiers, but for example, the convolutional neural network (CNN) and the like may be used. Note that when a color is used as the wake drawing method, a network channel configuration changes because the input of the CNN changes from a grayscale image to a color image.

Moreover, in the present example embodiment, as will be described below, it is possible to configure a ship behavior analyzing device by using the parameters (learned parameters) obtained by the pattern learning unit.

Figure 6:
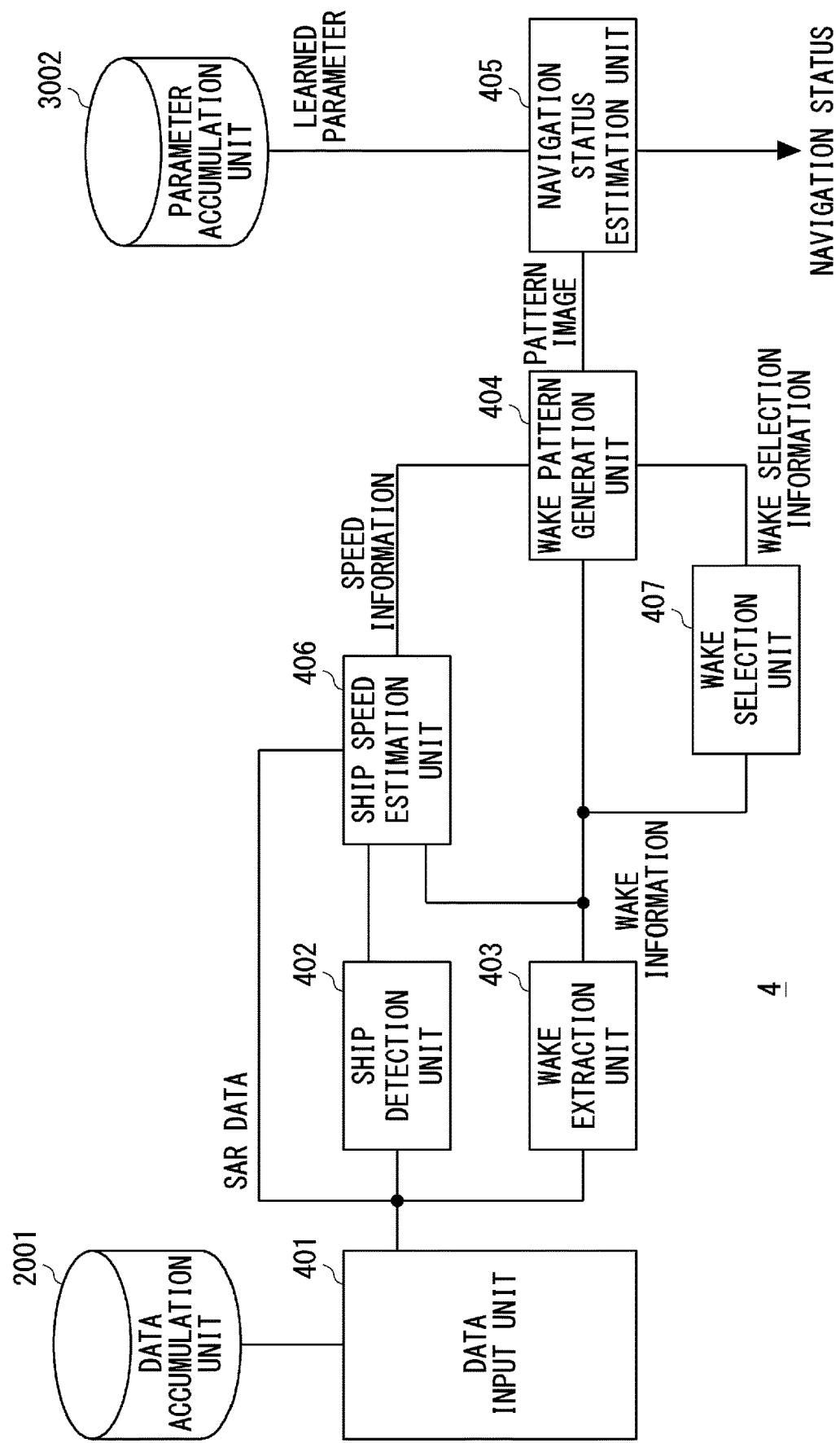
FIG. 6 is a block diagram illustrating a ship behavior analyzing device configured using parameters obtained by the ship behavior learning device according to the second example embodiment of the present invention.

A ship behavior analyzing device 4 illustrated in FIG. 6 includes a data input unit 401, a ship detection unit 402, a wake extraction unit 403, a wake pattern generation unit 404, a navigation status estimation unit 405, a ship speed estimation unit 406, a wake selection unit 407, a data accumulation unit 2001, and a parameter accumulation unit 3002. That is, a control unit of the ship behavior analyzing device 4 serves as a functional calculation unit that performs each of these subdivided processes. The control unit has a central processing unit (CPU), a main storage device, an auxiliary storage device, an external interface, and the like.

The auxiliary storage device is an example of a non-transitory computer-readable medium to be described below.

Since the data accumulation unit 2001 is the same as that of the first example embodiment, a description thereof will be omitted.

The data input unit 401 outputs SAR data to be analyzed to the ship detection unit 402, the wake extraction unit 403, and the ship speed estimation unit 406 from the data accumulation unit 2001 that accumulates the synthetic aperture radar (SAR) data obtained by capturing the ocean. The SAR data is composed of the SAR image and its metadata (including observation time, observation conditions, and the like).

The ship detection unit 402 applies a ship detection process to the SAR data input from the data input unit 401, and detects ships. Then, the ship detection unit 402 outputs information (positions, sizes, and the like of the ships) of the detected ships to the wake extraction unit 403 and the ship speed estimation unit 406.

The wake extraction unit 403 extracts a wake from the SAR data input from the data input unit 401, on the basis of the ship information input from the ship detection unit 402. Then, the wake extraction unit 403 outputs information (position) on the extracted wake to the wake pattern generation unit 404, the ship speed estimation unit 406, and the wake selection unit 407.

The wake pattern generation unit 404 generates wake pattern images on the basis of the wake information input from the wake extraction unit 403, ship speed information input from the ship speed estimation unit 406, and wake selection information input from the wake selection unit 407. Then, the wake pattern generation unit 404 outputs the generated wake pattern images to the navigation status estimation unit 405.

The navigation status estimation unit 405 obtains learned classifier parameters with reference to the parameter accumulation unit 3002, reconstructs a classifier having the same configuration as the classifier learned by the pattern learning unit 303 described above, and estimates a navigation status of each wake pattern image from the wake pattern images input from the wake pattern generation unit 404. Then, the navigation status estimation unit 405 outputs the estimated navigation status.

The ship speed estimation unit 406 estimates the speed of the ship from the SAR data input from the data input unit 401, the ship information input from the ship detection unit 402, and the wake information input from the wake extraction unit 403. Then, the ship speed estimation unit 406 outputs the estimated speed of the ship to the wake pattern generation unit 404.

The wake selection unit 407 selects a wake to be used for pattern generation, on the basis of the wake information input from the wake extraction unit 403. Then, the wake selection unit 407 outputs information of the selected wake to the wake pattern generation unit 404.

Since the ship detection unit 402, the wake extraction unit 403, and the navigation status estimation unit 405 are substantially the same as those of the aforementioned example embodiment except for data input/output, a detailed description thereof will be omitted.

Hereinafter, details of the operations of the ship speed estimation unit 406, the wake selection unit 407, and the wake pattern generation unit 404 will be described as characteristic parts of the navigation status estimation device.

The following description will be provided for the process in which the ship speed estimation unit 406 estimates the speed of the ship on the basis of the SAR data, the ship information, and the wake information.

Figure 7:
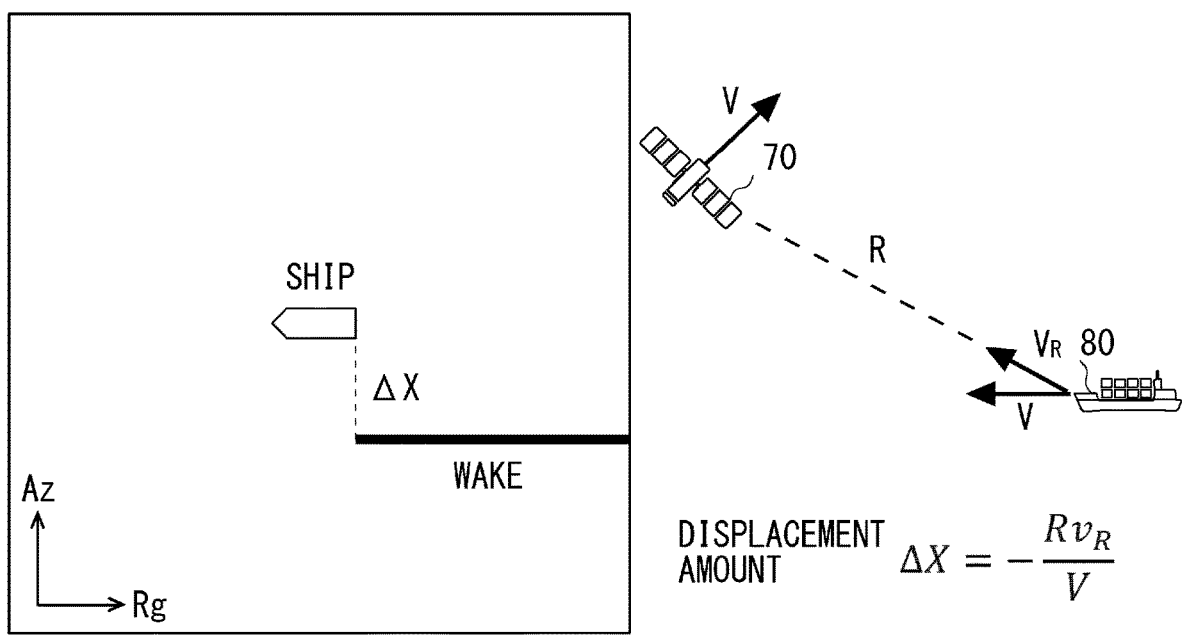
FIG. 7 is a diagram for explaining the displacement of a moving body on a SAR image.

FIG. 7 is a diagram for explaining the displacement of a moving body on the SAR image. The SAR image has a characteristic that the moving body within a capturing range is displaced from the original position and an image of the moving body is formed. The displacement amount ΔX is calculated by the following formula by using a movement speed V of a platform (artificial satellite) 70 provided with a SAR antenna, a distance R between the platform 70 and a moving body 80 on the ground surface, and a movement speed $v_R$ of the moving body 80 in the platform direction.

[Math 8]

$$\Delta X = -\frac{R v_R}{V} \quad \text{(Formula 8)}$$

In general, the movement speed V of the platform 70 and the distance R between the platform 70 and the moving body 80 on the ground surface can be extracted from the metadata of the SAR data. When the position of the ship and the position of the wake are given, ΔX can be estimated from the image, so the speed of the moving body 80 on the ground surface can be estimated only from the SAR data.

Figure 8:
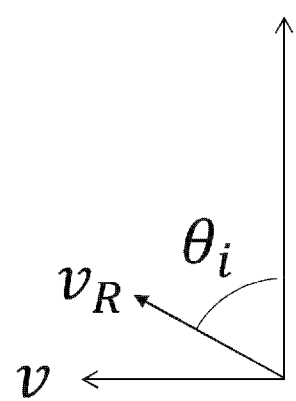
FIG. 8 is a diagram illustrating the relationship among a radar incident angle, a speed in a platform direction, and a speed in a ground surface direction.

Since the speed estimated herein is a movement speed in the platform direction, when the moving body 80 is a ship as in the present example embodiment, the speed needs to be converted into a speed in the direction along the ground surface. FIG. 8 is a diagram illustrating the relationship among a radar incident angle $\theta_i$, the speed $v_R$ in the platform direction, and a speed v in the ground surface direction. From this, the following formula is satisfied.

[Math 9]

$$v = \frac{v_R}{\cos(90° - \theta_i)} \quad \text{(Formula 9)}$$

The radar incident angle information at each point in the image can be generally extracted from the metadata of the SAR data, similarly to the movement speed V of the platform 70 and the distance R between the platform 70 and an object on the ground surface (moving body 80).

Figure 9:
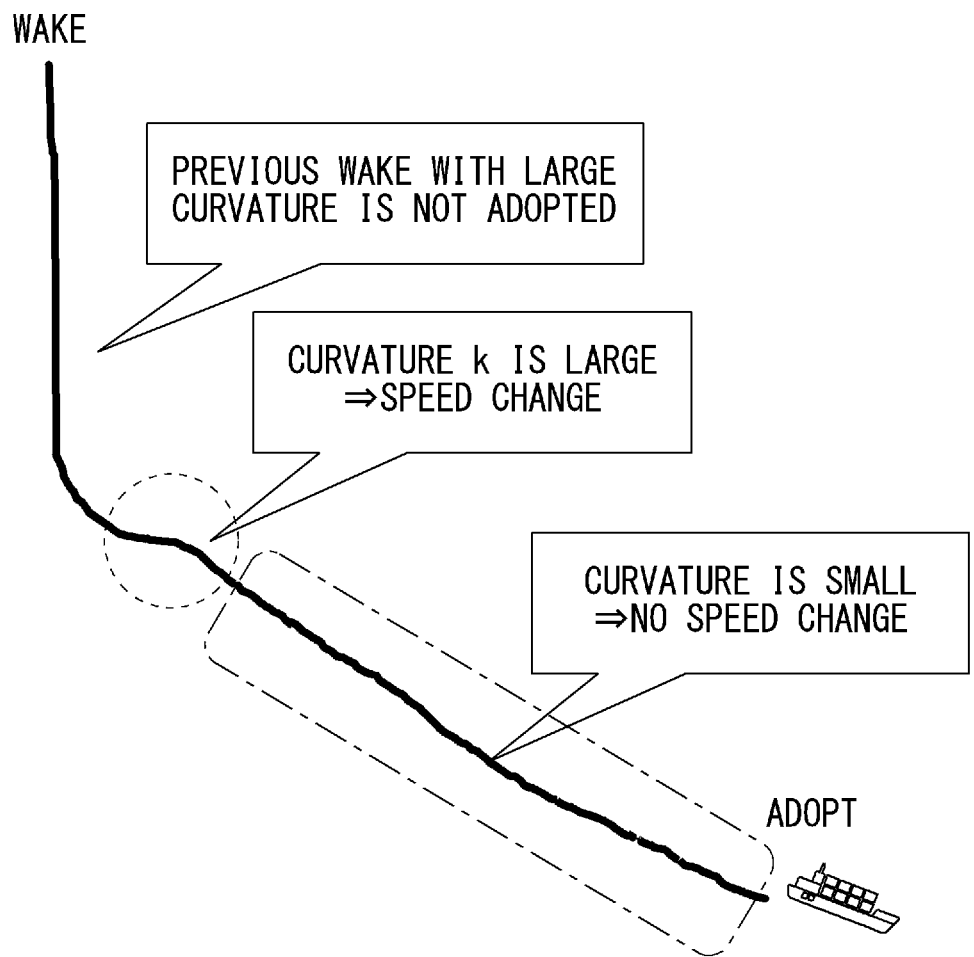
FIG. 9 is a diagram for explaining a method for determining a wake pattern to be adopted.
Figure 10:
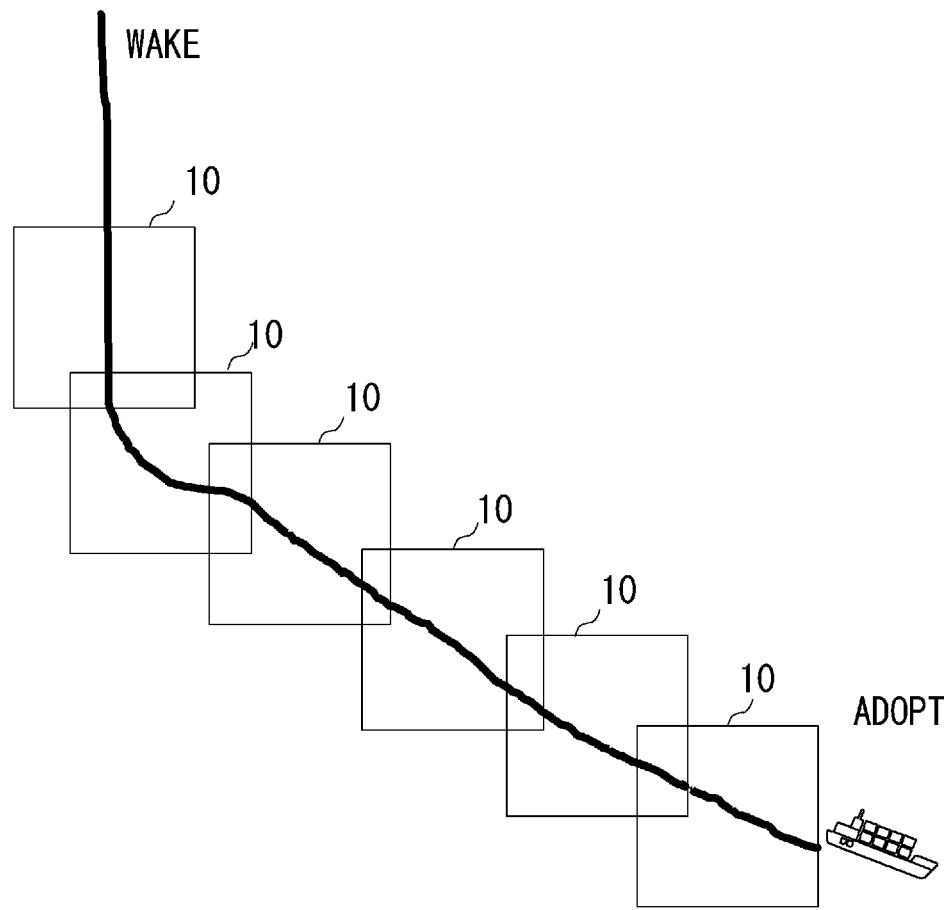
FIG. 10 is a diagram for explaining a method for determining a wake pattern to be adopted.

With reference to FIG. 9 and FIG. 10, the following description will be provided for the process in which the wake selection unit 407 selects the wake to be used for pattern generation, on the basis of the wake information.

The speed data of a ship estimated from the SAR data is only for the timing at the time of capturing the SAR data, but generally, as illustrated in FIG. 9, the speed change is small when the ship is traveling linearly (when curvature is small). Therefore, as illustrated in FIG. 10, in order from the wake close to the ship, the wake selection unit 407 regards the wake in windows 10 with a predetermined size as a straight line to obtain an angle, and when the change in the angle is large, the wake selection unit 407 regards that the speed change has occurred and terminates the wake. That is, in FIG. 10, the wake selection unit 407 regards that the speed change has occurred in the fifth window 10 from the wake close to the ship, and adopts the wake in the four windows 10 close to the ship. As described above, the wake selection unit 407 selects a wake, whose angle is equal to or less than a threshold value, from wakes close to a target ship.

Although various methods can be used to calculate the angle of a wake, the Radon transform may be used similarly to the wake extraction. The angle of the most prominent straight line in each window is obtained in order from a window located closest to a ship, and when the difference with the angle of a straight line in an immediately previous window exceeds a predetermined value, the wake selection unit 407 terminates the wake.

The following description will be provided for the process in which the wake pattern generation unit 404 generates the wake pattern images on the basis of the wake information, the ship speed information, and the wake selection information.

Since the wake pattern image input to the navigation status estimation unit 405 is an image that reflects the speed information, the wake pattern generation unit 404 superimposes the speed information on the extracted wake in the same manner as the wake pattern generation unit 302, on the basis of the ship speed information. The wake pattern generation unit 404 allows sea surface pixels other than the wake to be black. Then, the wake pattern generation unit 404 cuts out a wake image in a window with the same size as the wake pattern image used by the pattern learning unit 103 so that points on the wake are the center of the window at a predetermined sampling interval from the start point of the wake to the end point of the wake determined on the basis of the ship selection information.

Hereinafter, effects of the present example embodiment will be described. In the present example embodiment, the amount of information on a navigation status is increased by superimposing ship speed information on a wake, so that it is possible to stably estimate a navigation status which is difficult to classify only from the wake.

As is clear from the aforementioned description, each part can also be configured by hardware, but it can also be implemented by a computer program. In such a case, a processor, which operates in a program stored in a program memory, implements the same functions and operations as those in the aforementioned example embodiments. Furthermore, only a part of the functions of the aforementioned example embodiments can also be implemented by the computer program.

Although the present invention has been described with the preferred example embodiments, the present invention is not always limited to the above example embodiments and can be variously modified and embodied within the range of the technical idea of the present invention. For example, the first example embodiment and the second example embodiment can be used at the same time, and for a wake after the speed change is regarded to have occurred in the second example embodiment, a wake image may be generated by the method of the first example embodiment and a navigation status may be estimated by the navigation status estimation unit of the first example embodiment.

The present disclosure is not limited to the aforementioned example embodiments, and can be appropriately changed without departing from the spirit. Furthermore, the present disclosure may also be embodied by appropriately combining the respective example embodiments.

In the aforementioned examples, the program can be stored using various types of non-transitory computer readable mediums, and can be supplied to a computer. The non-transitory computer readable medium includes various types of tangible storage mediums. Examples of the non-transitory computer readable medium include a magnetic recording medium (for example, a flexible disk, a magnetic tape, a hard disk drive), a magneto-optical recording medium (for example, a magneto-optical disk), a CD-ROM (Read Only Memory), a CD-R, a CD-R/W, a digital versatile disc (DVD), a blue-ray (registered trademark) disc (BD), a semiconductor memory (for example, a mask ROM, a programmable ROM (PROM), an erasable ROM (EPROM), a flash ROM, a random access memory (RAM)). Furthermore, the program may also be supplied to the computer by various types of transitory computer readable mediums. Examples of the transitory computer readable medium include an electrical signal, an optical signal, and an electromagnetic wave. The transitory computer readable medium can supply the program to the computer via a wired communication path such as an electric wire and an optical fiber or a wireless communication path.

REFERENCE SIGNS LIST

1 SHIP BEHAVIOR LEARNING DEVICE
2 SHIP BEHAVIOR ANALYZING DEVICE
3 SHIP BEHAVIOR LEARNING DEVICE
4 SHIP BEHAVIOR ANALYZING DEVICE
101 DATA INPUT UNIT
102 WAKE PATTERN GENERATION UNIT
103 PATTERN LEARNING UNIT
201 DATA INPUT UNIT
202 SHIP DETECTION UNIT
203 WAKE EXTRACTION UNIT
204 WAKE PATTERN GENERATION UNIT
205 NAVIGATION STATUS ESTIMATION UNIT
301 DATA INPUT UNIT
302 WAKE PATTERN GENERATION UNIT
303 PATTERN LEARNING UNIT
401 DATA INPUT UNIT
402 SHIP DETECTION UNIT
403 WAKE EXTRACTION UNIT
404 WAKE PATTERN GENERATION UNIT
405 NAVIGATION STATUS ESTIMATION UNIT
406 SHIP SPEED ESTIMATION UNIT
407 WAKE SELECTION UNIT
1001 DATA ACCUMULATION UNIT
1002 PARAMETER ACCUMULATION UNIT
2001 DATA ACCUMULATION UNIT
3002 PARAMETER ACCUMULATION UNIT

What is claimed is:

1. A ship behavior analyzing device comprising:
at least one processor; and
at least one memory storing instructions executable by the processor to:
detect a ship from synthetic aperture radar data;
generate a plurality of windows corresponding to a ship cluster, using a detection result of the ship, each window having a predetermined size centered on center coordinates of the ship cluster;
for each window, apply a Radon transform to pixels of the window and extract a wake in a Radon space;
obtain a most prominent straight line in each window in order from the window located closest to the ship;
select the wake for the window in which a difference between an angle of the obtained line and an angle of a straight line in an immediately previous window is equal to or less than a predetermined value based on wake information;
generate a wake pattern image by using the selected wake; and
estimate a navigation status of the ship by using the generated wake pattern image.

2. The ship behavior analyzing device according to claim 1, wherein the instructions are executable by the at least one processor to estimate the navigation status of the ship by using a learned parameter generated in advance by machine learning by using a plurality of wake patterns and a correct navigation status corresponding to each of the plurality of wake patterns.

3. The ship behavior analyzing device according to claim 2, wherein the instructions are executable by the at least one processor to generate the wake patterns in such a way that the wake is drawn by a different drawing method according to a speed of the ship.

4. The ship behavior analyzing device according to claim 3, wherein the drawing method is selected from a group including a line color, a line thickness, and a line type of the wake pattern.

5. The ship behavior analyzing device according to claim 1, wherein the instructions are executable by the at least one processor to detect the ship by using adaptive thresholding.

6. A ship behavior analyzing method executable by a computer and comprising:
   detecting a ship from synthetic aperture radar data;
   generating a plurality of windows corresponding to a ship cluster, using a detection result of the ship, each window having a predetermined size centered on center coordinates of the ship cluster;
   for each window, applying a Radon transform to pixels of the window and extracting a wake in a Radon space;
   obtaining a most prominent straight line in each window in order from a window located closest to the ship;
   selecting the wake for the window in which a difference between an angle of the obtained line and an angle of a straight line in an immediately previous window is equal to or less than a predetermined value based on wake information;
   generating a wake pattern image by using the selected wake; and
   estimating a navigation status of the ship by using the generated wake pattern image.

7. A non-transitory computer-readable medium storing a program causing a computer to perform:
   detecting a ship from synthetic aperture radar data;
   generating a plurality of windows corresponding to a ship cluster, using a detection result of the ship, each window having a predetermined size centered on center coordinates of the ship cluster;
   for each window, applying a Radon transform to pixels of the window and extracting a wake in a Radon space;
   obtaining a most prominent straight line in each window in order from a window located closest to the ship;
   selecting the wake for the window in which a difference between an angle of the obtained line and an angle of a straight line in an immediately previous window is equal to or less than a predetermined value based on wake information;
   generating a wake pattern image by using the selected wake; and
   estimating a navigation status of the ship by using the generated wake pattern image.

* * * * *